(12) United States Patent
Badding et al.

(10) Patent No.: US 12,341,148 B2
(45) Date of Patent: Jun. 24, 2025

(54) METHOD FOR MAKING UNIFORM POROUS SURFACE LAYER ON GARNET THIN FILM

(71) Applicant: CORNING INCORPORATED, Corning, NY (US)

(72) Inventors: Michael Edward Badding, Campbell, NY (US); Yinghong Chen, Painted Post, NY (US); Aaron David DeGeorge, Painted Post, NY (US); Zhen Song, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/206,275

(22) Filed: Jun. 6, 2023

(65) Prior Publication Data
US 2023/0318023 A1    Oct. 5, 2023

Related U.S. Application Data

(63) Continuation of application No. 17/508,003, filed on Oct. 22, 2021, now abandoned.

(51) Int. Cl.
*H01M 10/0525* (2010.01)
*C04B 35/50* (2006.01)
*H01M 10/052* (2010.01)
*H01M 10/0562* (2010.01)
*H01M 10/058* (2010.01)
(Continued)

(52) U.S. Cl.
CPC ......... *H01M 10/0525* (2013.01); *C04B 35/50* (2013.01); *H01M 10/052* (2013.01); *H01M 10/0562* (2013.01); *H01M 10/058* (2013.01);

*H01M 50/403* (2021.01); *H01M 50/434* (2021.01); *H01M 50/489* (2021.01);
(Continued)

(58) Field of Classification Search
CPC ........................ C04B 35/50; C04B 2235/764
See application file for complete search history.

(56) References Cited

U.S. PATENT DOCUMENTS 10,211,481 B2    2/2019    Badding et al.
10,622,666 B2    4/2020    Wachsman et al.
(Continued)

FOREIGN PATENT DOCUMENTS

CN    111384390 A  *  7/2020
WO    2016/085792 A1    6/2016

OTHER PUBLICATIONS

CN-111384390-A machine translation (Year: 2020).*
(Continued)

*Primary Examiner* — Bryan D. Ripa
*Assistant Examiner* — Cameron K Miller

(57) ABSTRACT

A solid garnet composition includes a bulk composition having a lithium garnet; and a surface composition having a protonated garnet on at least a portion of the exterior surface of the lithium garnet, such that the protonated garnet is uniformly disposed over the at least a portion of the exterior surface of the lithium garnet. A method of making a solid garnet composition includes pre-treating an air sensitive lithium-containing garnet with water to form a uniform protonated garnet surface composition; and contacting the uniform protonated garnet surface composition with an acid to form a porous uniform protonated garnet surface composition.

20 Claims, 7 Drawing Sheets

(51) Int. Cl.
  *H01M 50/403* (2021.01)
  *H01M 50/434* (2021.01)
  *H01M 50/489* (2021.01)

(52) U.S. Cl.
  CPC .............. *C04B 2235/764* (2013.01); *H01M 2300/0071* (2013.01)

(56) References Cited

U.S. PATENT DOCUMENTS

| | | | |
|---|---|---|---|
| 10,651,502 | B2 | 5/2020 | Holme et al. |
| 10,700,137 | B2 | 6/2020 | Chen |
| 2016/0149260 | A1 | 5/2016 | Badding et al. |
| 2019/0245178 | A1* | 8/2019 | Cao .............. H01M 10/4235 |
| 2020/0083562 | A1 | 3/2020 | Kim et al. |
| 2021/0242495 | A1 | 8/2021 | Kim et al. |

OTHER PUBLICATIONS

Xu, Jingru, et al. "Effect of acid treatment of Li7La3Zr2O12 on ionic conductivity of composite solid electrolytes." IOP Conference Series: Earth and Environmental Science. Vol. 512. No. 1. IOP Publishing, 2020. (Year: 2020).*

Hanyu et al., "In-situ formed Li2CO3-free garnet/Li interface by rapid acid treatment for dendrite-free solid-state batteries", Nano Energy, vol. 61, Jul. 2019, pp. 119-125.

International Search Report and Written Opinion of the International Searching Authority; PCT/US2022/047403; dated Feb. 13, 2023; 12 pages; European Patent Office.

Jingru et al., "Effect of acid treatment of Li7La3Zr2O12 on ionic conductivity of composite solid electrolytes", IOP Conference Series: Earth and Environmental Science, vol. 512, No. 1, Jun. 2020, 7 pages.

Kun Yang et al., "Patternable Conjugated Polymers with Latent Hydrogen-Bonding on the Main Chain", Macromolecules, 47, Dec. 2014, pp. 8.

Reese et al., "Organic Thin Film Transistors", Materials Today, vol. 7, No. 9, Sep. 2004, pp. 20-27.

Ruan et al., "A 3D Cross-Linking Lithiophilic and Electronically Insulating Interfacial Engineering for Garnet-Type Solid-State Lithium Batteries", Advanced Functional Materials, vol. 31, No. 5, 2020, 10 pages.

* cited by examiner

METHOD FOR MAKING UNIFORM POROUS SURFACE LAYER ON GARNET THIN FILM

This application is a continuation of U.S. patent application Ser. No. 17/508,003 filed on Oct. 22, 2021, the content of which is relied upon and incorporated herein by reference in its entirety.

BACKGROUND

1. Field

This disclosure relates to methods for making uniform porous surface layers on garnet thin films Li-metal batteries.

2. Technical

Li-metal batteries are attractive for high energy density applications. Garnet solid electrolyte is advantageous for its stability on Li-metal and air environments, and ease with which it forms porous structures. Porous interlayers between garnet and Li may minimize Li-dendrite formation by (1) increasing the Li electrode-garnet electrolyte contact surface area, thereby removing current hot spots and (2) releasing stress created by Li plating processes.

Li plating is often non-uniform over the electrode-electrolyte interface. Fiber-like Li may extrude out of garnet during plating (charging). For a smooth interface, especially at lower cell running temperatures (e.g., room temperature), this plating behavior causes pulverization of the Li-anode at the interface, and eventually, causes Li delamination from the garnet. Porous interlayer can confine the extruded Li inside pores, and reduce the force from the extruded Li fibers on the Li electrode, therefore inhibiting the delamination from occurring. Porous interlayers may also reduce cell volume change during cycling.

This disclosure reports a modified acid treatment method to form a uniform porous layer on garnet and a porous composition thereof.

SUMMARY

In embodiments, a solid garnet composition comprises a bulk composition comprising a lithium garnet; and a surface composition comprising a protonated garnet on at least a portion of the exterior surface of the lithium garnet, wherein the protonated garnet is uniformly disposed over the at least a portion of the exterior surface of the lithium garnet.

In aspects, which are combinable with any of the other aspects or embodiments, the surface protonated portion of the garnet is compositionally stable in air and insensitive to water and carbon dioxide. In aspects, which are combinable with any of the other aspects or embodiments, the protonated garnet has: a thickness in a range of 2 µm to 30 µm and a pore size in a range of 0.1 µm to 10 µm. In aspects, which are combinable with any of the other aspects or embodiments, the lithium garnet is $Li_7La_3Zr_2O_{12}$ and the protonated garnet is $Li_{(7-x)}H_xLa_3Zr_2O_{12}$, where x is from 0.1 to 7. In aspects, which are combinable with any of the other aspects or embodiments, the protonated garnet on at least a portion of the exterior surface of the lithium garnet comprises the entire exterior surface of the lithium garnet. In aspects, which are combinable with any of the other aspects or embodiments, the surface composition comprises a surface free of at least one of LiOH, $Li_2CO_3$, or a combination thereof.

In embodiments, a method of making a solid garnet composition comprises pre-treating an air sensitive lithium-containing garnet with water to form a uniform protonated garnet surface composition; and contacting the uniform protonated garnet surface composition with an acid to form a porous uniform protonated garnet surface composition.

In aspects, which are combinable with any of the other aspects or embodiments, the step of pre-treating comprises: soaking the air sensitive lithium-containing garnet in water at a temperature in a range of 0° C. to 50° C. for a time in a range of 0.5 min to 60 min. In aspects, which are combinable with any of the other aspects or embodiments, the temperature is in a range of room temperature to 50° C. and the time is in a range of 5 min to 30 min.

In aspects, which are combinable with any of the other aspects or embodiments, the acid is selected from at least one of: a mineral acid, an organic acid, or a combination thereof. In aspects, which are combinable with any of the other aspects or embodiments, the acid comprises at least one of hydrochloric acid, nitric acid, acetic acid, sulfuric acid, citric acid, carbonic acid, phosphoric acid, hydrofluoric acid, oxalic acid, boric acid, or combinations thereof.

In aspects, which are combinable with any of the other aspects or embodiments, the acid is at a concentration in a range of 0.01M to 5M. In aspects, which are combinable with any of the other aspects or embodiments, the concentration is in a range of 0.5M to 2M.

In aspects, which are combinable with any of the other aspects or embodiments, the step of contacting is conducted at a temperature in a range of 15° C. to 25° C. for a time in a range of 0.5 min to 60 min. In aspects, which are combinable with any of the other aspects or embodiments, the time is in a range of 5 min to 30 min.

In aspects, which are combinable with any of the other aspects or embodiments, the porous uniform protonated garnet surface composition has a thickness in a range of 2 µm to 30 µm. In aspects, which are combinable with any of the other aspects or embodiments, the thickness is in a range of 2 µm to 10 µm. In aspects, which are combinable with any of the other aspects or embodiments, the porous uniform protonated garnet surface composition has a pore size in a range of 0.1 µm to 10 µm. In aspects, which are combinable with any of the other aspects or embodiments, the pore size is in a range of 1 µm to 5 µm.

In aspects, which are combinable with any of the other aspects or embodiments, prior to the step of pre-treating: exposing the air sensitive lithium-containing garnet to a heat treatment in a water free and $CO_2$ free environment.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Figure 1:
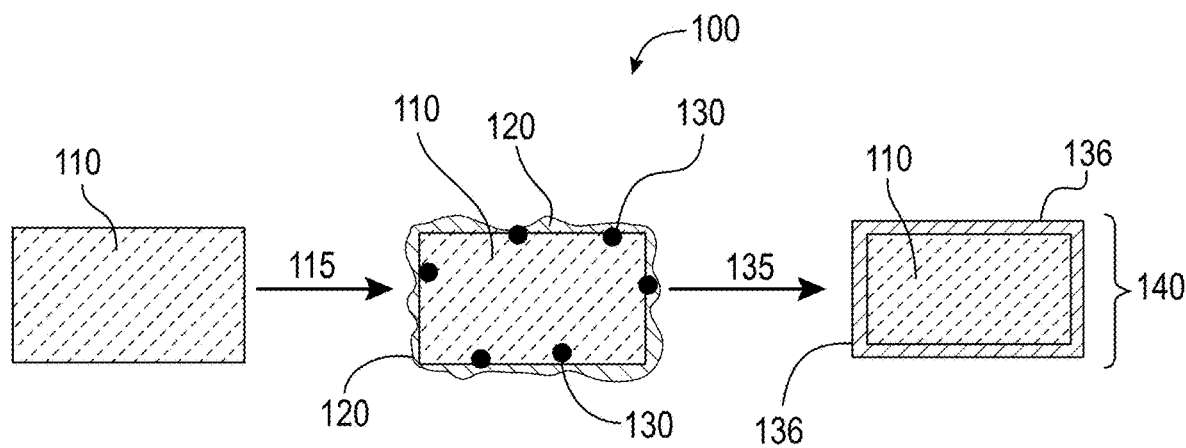
FIG. 1 illustrates a schematic showing applicable acid treatment and regeneration steps, according to embodiments.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments. It should be understood that the present application is not limited to the details or methodology set forth in the description or illustrated in the figures. It should also be understood that the terminology is for the purpose of description only and should not be regarded as limiting.

Additionally, any examples set forth in this specification are illustrative, but not limiting, and merely set forth some of the many possible embodiments of the claimed invention. Other suitable modifications and adaptations of the variety of conditions and parameters normally encountered in the field, and which would be apparent to those skilled in the art, are within the spirit and scope of the disclosure.

Definitions

"Air," "ambient air," "ambient atmosphere," "atmospheric air", or like terms refers to chemical constituents occurring in earth's atmosphere, for example, dry air contains 78.09% nitrogen, 20.95% oxygen, 0.93% argon, 0.039% carbon dioxide, and small amounts of other gases. Humid air also includes water vapor.

"Compositionally stable," or like terms refers to the disclosed solid garnet composition, which composition once formed does not significantly change its composition, for example, when exposed to ambient atmosphere for several hrs or more.

"Air stable," or like terms also refers to the disclosed solid garnet composition, which composition once formed does not significantly change its composition, for example, when exposed to air or ambient atmosphere for several hrs or more.

"Insensitive to carbon dioxide," or like terms or phrases also refers to the disclosed solid garnet composition, which composition once formed does not significantly change its composition, for example, when exposed to air or ambient atmosphere containing carbon dioxide for several hrs or more.

"LLZO," "garnet," or like terms refer to compounds comprising lithium (Li), lanthanum (La), zirconium (Zr), and oxygen (O) elements. Optionally, dopant elements may substitute at least one of Li, La, or Zr.

For example, lithium-garnet electrolyte comprises at least one of: (i) $Li_{7-3a}La_3Zr_2L_aO_{12}$, with L=Al, Ga or Fe and 0<a<0.33; (ii) $Li_7La_{3-b}Zr_2M_bO_{12}$, with M=Bi, Ca, or Y and 0<b<1; (iii) $Li_{7-c}La_3(Zr_{2-c},N_c)O_{12}$, with N=In, Si, Ge, Sn, V, W, Te, Nb, or Ta and 0<c<1; (iv) $Li_{7-x}La_3(Zr_{2-x}, M_x)O_{12}$, with M=In, Si, Ge, Sn, Sb, Sc, Ti, Hf, V, W, Te, Nb, Ta, Al, Ga, Fe, Bi, Y, Mg, Ca, or combinations thereof and 0<x<1, or a combination thereof.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "RT" for room temperature (e.g., 15° C. to 25° C.), "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The compositions, articles, and methods of the disclosure can include any value or any combination of the values, specific values, more specific values, and preferred values described herein, including explicit or implicit intermediate values and ranges.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

As ceramic lithium electrolytes have practical conductivities in excess of $10^{-4}$ S/cm, there is an interest in other ceramic Li-ion electrolytes that can enable high energy cell structures. New designs rely on the ceramic electrolyte to separate incompatible anode and cathode chemistries through hermetic isolation.

To enable a Li-metal anode, the ceramic electrolyte must be stable against lithium metal contact. Presently, garnet phase electrolytes have demonstrated both high lithium-ion conductivity (greater than $10^{-4}$ S/cm) and stability against Li-metal contact. However, garnet materials are susceptible to forming an insulating film of lithium carbonate on exposure to ambient conditions. This insulating film can dominate the impedance of a cell if not removed. Polishing under inert atmosphere is one possible solution to removal of the insulating $Li_2CO_3$ film. However, after polishing, the garnet material must be protected from further ambient exposure, or the lithium carbonate insulating film will form again. An ability to render the garnet electrolyte structures insensitive to ambient carbon dioxide to permit ambient processing is desirable.

Garnet materials reversibly undergo $H^+/Li^+$ exchange in aqueous solutions. When an as-synthesized garnet material is immersed in neutral water, the pH of the aqueous phase shifts towards a basic pH due to formation of LiOH. In one example, $Li_7La_3Zr_2O_{12}$ (LLZO) garnet undergoes the following reaction:

$$Li_7La_3Zr_2O_{12} + xH_2O \rightarrow Li_{(7-x)}H_xLa_3Zr_2O_{12} + x\ LiOH$$

This same reaction occurs at the surface of a garnet material handled in ambient air. LiOH getters or absorbs atmospheric $CO_2$ to form $Li_2CO_3$ according to the following equations:

$$2LiOH\text{---}H_2O + CO_2 \rightarrow Li_2CO_3 + 3H_2O$$

or $$2LiOH + CO_2 \rightarrow Li_2CO_3 + H_2O$$

The end product of the reaction sequence is an insulating surface film of lithium carbonate ($Li_2CO_3$).

Since the $H^+/Li^+$ exchange is reversible, it is possible to treat the garnet material in acid to neutralize the surface of the garnet material and decompose the formed $Li_2CO_3$. For example, $Li_2CO_3$ can be decomposed with HCl:

$$Li_2CO_3 + 2HCl \rightarrow 2LiCl + H_2O + CO_2$$

Acid treatment is one way to make porous surface structures on garnet, while also enabling impurity cleaning of, for example $Li_2CO_3$, from the garnet surface, and forms an inert H-LLZO layer. H-LLZO is chemically stable in air, which allows time for cell assembly and lower requirement of the atmosphere for cell assembly. However, problems still arise in non-uniformity of the interfacial resistance over the garnet surface, which is due to non-uniformity of the porous structure on garnet generated by acid treatment.

As provided herein, a modified acid treatment method is provided that combines annealing and water soaking before acid treatment. With this method, a uniform porous layer on garnet may be demonstrated. A composition that is more easily formed from such porous structure by the treatment is shown, and the method to make such garnet thin film.

In embodiments, the disclosed method can effectively clean the garnet surface of, for example, LiOH, $Li_2CO_3$, and like species. The disclosed method can also effectively regenerate a lithium ion active garnet surface for use, for example, in an energy storage article. In embodiments, the disclosure provides a solid garnet electrolyte article and to methods of making and using the solid garnet electrolyte article in an energy storage device. In embodiments, the disclosure provides an air stabilized solid garnet composition and a solid electrolyte article thereof, and the disclosure provides methods of making and using the composition and the stabilized solid garnet electrolyte article.

In embodiments, the disclosure provides a method for passivating a solid lithium garnet electrolyte against surface fouling by ambient atmosphere. In embodiments, the disclosure provides a method for treating a solid lithium garnet electrolyte, which treatment method permits ambient handling or processing of the garnet electrolyte. In embodiments, the disclosure provides a method for regenerating, either in situ or ex situ, a passivated solid garnet electrolyte to produce an active lithium ion surface specie suitable for use in an energy storage device. The disclosure provides an example of in situ regeneration. In embodiments, the disclosure provides a solution treatment method of a solid garnet electrolyte that cleans $Li_2CO_3$ from the surface, which can lead to improved cell performance.

In embodiments, the disclosure provides a passivation method where a garnet membrane having lithium containing surface is converted to a garnet membrane product having a lithium-deficient surface, which product is stable to, for example, atmospheric moisture, oxygen, and carbon dioxide. In embodiments, the passivation method comprises an ion exchange of lithium ions of the garnet membrane with protons (i.e., $Li^+/H^+$ exchange). The resulting super-protonated membrane can be handled under ambient conditions without concern for carbonate film formation. The super-protonated garnet can then be electrochemically converted back to a lithium-rich garnet with a lithium-containing electrode.

In embodiments, the disclosure provides a method, by which water pre treatment generates a more uniform protonated garnet surface, as compared to after air exposure. The uniform protonated garnet surface allows a uniform porous surface by acid treatment.

The present disclosure is advantaged in several aspects, including for example: the disclosed treatment method eliminates a resistive carbonate surface layer on the garnet substrate, which eliminated resistive carbonate surface layer, and improves the performance of a cell including a garnet electrolyte.

The method of making, involving contacting the garnet electrolyte with a protic acid, can be applied to a garnet electrolyte in numerous forms, which is impractical for alternative surface treatment methods such as surface polishing. Example garnet electrolyte forms that can be treated according to the disclosed method include: a porous garnet surface (which can be useful for improving electrode contact), a thin garnet coating (e.g., less than 20 µm thick), a thin garnet membrane (e.g., less than 200 µm thick such as 150 µm, 100 µm, 50 µm, 40 µm, 30 µm, 20 µm including intermediate values and ranges), and like forms.

The method of making involving acid treatment of, for example, the lithium garnet electrolyte can be accomplished with a brief exposure to the acid, for example, from 1 to 30 min at ambient temperature. Since the lithium ion species in the garnet electrolyte surface are chemically neutralized by the disclosed method, the formation of lithium carbonate is at least temporarily mitigated and ambient air handling of the garnet membrane is now possible, and simplifies cell construction and lowers fabrication costs.

In embodiments, the present disclosure provides a solid garnet composition, comprising: a bulk composition comprising a lithium garnet; and a surface composition comprising a surface protonated garnet on at least a portion of the exterior surface of the lithium garnet, wherein the surface protonated portion of the garnet composition is compositionally stable in air and insensitive to carbon dioxide.

In embodiments, the disclosure provides a solid garnet composition, comprising: a bulk composition consisting of or consisting essentially of a lithium garnet; and a surface composition consisting of or consisting essentially of a surface protonated garnet on at least a portion of the exterior surface of the lithium garnet, wherein the surface protonated solid garnet composition is compositionally stable in air and insensitive to carbon dioxide.

In embodiments, the bulk lithium garnet can be, for example, of the formula $Li_7La_3Zr_2O_{12}$ (LLZO) and the surface protonated garnet can be, for example, of the formula $Li_{(7-x)}H_xLa_3Zr_2O_{12}$, where x is from 0.1 to 7.

In embodiments, the surface protonated garnet can be, for example, formed on opposite sides or faces of the acid treated solid garnet composition such as the large faces or small faces the treated membrane. The non-acid treated surfaces can be, for example, protected with a mask layer. In embodiments, the surface protonated garnet can be, for example, formed on the entire outer surface of the bulk lithium garnet.

In embodiments, the protonated garnet on at least a portion of the exterior surface of the lithium garnet includes, for example, the entire exterior surface of the lithium garnet. In embodiments, the protonated garnet on at least a portion of the exterior surface of the lithium garnet includes, for example, a layer having a thickness of from 2-10 µm. In embodiments, the surface composition has a lithium concentration of from 0.1 to 46 mol %.

In embodiments, the surface composition can be, for example, substantially free of an electrically insulating Li surface species, for example, from 0 to less than from 10 mol %. In embodiments, the surface composition comprises a surface free of at least one of LiOH, $Li_2CO_3$, or a combination thereof.

In embodiments, the disclosure provides a composite electrolyte structure, comprising: a protected anode structure comprising: a first layer comprising a solid ceramic garnet electrolyte composition comprising a solid garnet composition, comprising: a bulk composition comprising a lithium garnet; and a surface composition comprising a protonated garnet with porous or rough surface structure on at least a portion of the exterior surface of the lithium garnet, wherein the solid garnet composition is compositionally stable in air and insensitive to carbon dioxide; a second layer comprising a source of lithium metal, wherein the first layer and the second layer are in physical contact, and contained within the protected anode structure; and a cathode.

In embodiments, the composite electrolyte structure can further comprise, for example, an aqueous catholyte situated between and in contact with the cathode. In embodiments, the cathode can be, for example, a lithium cobalt oxide compound of the formula $LiCoO_2$.

In embodiments, the disclosure provides a method of making the aforementioned solid garnet solid, comprising: contacting an air sensitive lithium containing solid garnet electrolyte with a protic acid to form a solid garnet electrolyte having a protonated surface. In embodiments, the protonated surface solid garnet composition is compositionally stable in air and insensitive to carbon dioxide.

In embodiments, the protic acid can selected be, for example, from at least one of: a mineral acid, for example, HCl, $H_3PO_4$, $HNO_3$, $H_2SO_4$, and like acids, or mixtures thereof, an organic acid, for example, acetic acid, or like organic acids, or mixtures thereof, or a combination of mineral and organic acids. In embodiments, the method of making can further comprise, for example, contacting the air stable and carbon dioxide insensitive solid garnet electrolyte having the protonated surface with a source of lithium ions to regenerate the air sensitive lithium containing solid garnet electrolyte.

In embodiments, the contacting with a source of lithium ions can be accomplished, for example, in a sealed cell structure, for example, treating the garnet electrolyte with a lithium ion source where the garnet electrolyte is in a sealed cell structure and not on a bare membrane. In embodiments, the source of lithium ions can be, for example, lithium metal, or Li containing alloys. In embodiments, the disclosure provides a passivation method comprising: ion exchanging the lithium ions on the surface of an air sensitive lithium containing solid garnet membrane with protons to form an air stable and a water and carbon dioxide insensitive solid garnet electrolyte having a lithium-depleted protonated surface.

Referring to the figures, FIG. 1 illustrates a schematic (100) showing applicable acid treatment and regeneration steps. In embodiments, when a LLZO membrane (110) is exposed to ambient atmosphere or air (115) containing, for example, carbon dioxide and water, a surface contamination layer (120) containing LiOH and $Li_2CO_3$ and minor amounts of HLZO (130) can be formed on the exposed surface, that is, products of exposure of the LLZO to the ambient atmosphere.

In embodiments, the atmosphere exposed surface can be cleaned of $Li_2CO_3$ and LiOH, and generated a layer of porous structure by treating the affected surface with a suitable protic acid source (135) to form a garnet membrane product (140) comprising porous protonated garnet composition (e.g., on one or more faces of the garnet membrane, on two opposite faces of the garnet membrane; or fully surrounding or encapsulating the LLZO membrane (110) as shown). Such protonated surface is less prone to further reaction with ambient moisture, which renders the surface stable against formation of a surface contamination layer (120) for a period of time exceeding several hours, permitting a substantial working time under ambient conditions.

In embodiments, a pre-water treatment of the garnet membranes can make a more uniform H-LLZO ($Li_{6.5-n}H_nLa_3Zr_{1.5}Ta_{0.5}O_{12}$, where n=1-3) than that by exposing the membrane to air. As a result, such surface after protic acid treatment generates more uniform porous layer.

In embodiments, at least a portion of the surface of a pristine LLZO membrane (110), for example, an LLZO or like membrane, can be contacted or treated directly with a protic acid source (135) to form a garnet membrane product (140) having bulk or interior composition (110), for example, an LLZO, and a protonated surface composition (136), for example, an HLZO, in the protic acid source contacted area(s). The product (140) and similarly contacted membranes are stabilized solid garnet electrolyte materials that can be further processed or handled in ambient atmosphere to make or assemble (e.g., cell assembly) articles or devices that include the surface protonated garnet membrane product (140) (e.g., as an electrolyte).

In embodiments, an assembled cell can include, for example, the above mentioned surface protonated and with certain porosity garnet electrolyte product.

EXAMPLES

The following Example(s) demonstrate making, use, and analysis of the disclosed article in accordance with the above general procedures.

As explained above, a modified acid treatment method is provided that combines water soaking before acid treatment (for example, prior to step (135) from FIG. 1 above). With this method, a uniform porous layer on garnet may be demonstrated. A composition that is more easily formed from such porous structure by the treatment is shown, and the method to make such garnet thin film.

Uniform garnet thin film is important for Li to plate and strip uniformly during charging and discharging processes. More uniform Li plating generates less stress to the anode. Too high stress imposed to the anode causes the anode to delaminate from garnet. Although porous garnet interlayer can reduce this stress, uniform Li plating can prevent current hot spot, and allows higher cell running current.

Acid etching may generate non-uniform porous structures. The following non-limiting examples indicate that the initial surface state of a garnet sample contributes the final acid-etched garnet surface structure. The examples compared various acid treatment methods comprising different starting states prior to the acid treatment, such as: (1) as-made garnet membrane that has been exposed to air for days, (2) refreshed garnet surface by heat treatment at 900° C. for 1 hr in an $O_2/Ar$ gas mixture, (3) air carbonated surface heat treatment at 800° C. for 1 hr in ambient air, representing a long air exposed garnet surface, and (4) heat treatment at 900° C. for 1 hr, thereafter soaking at room temperature or 50° C. water for 10 min.

When garnet surfaces are pre-heat treated, especially heated in ambient air, and then undergo acid treatment, it is difficult to generate porous structures of the garnet surfaces or generate non-uniform porous structures, with pore size, pore distribution, and porous structure depth being different at different locations. These surface non-uniformities lead to Li plating non-uniformity. As demonstrated herein, water soaking at room temperature, and then followed by acid treatment, generates garnet surfaces which form uniform porous structures.

Thus, a garnet treatment method was developed to generate uniform porous layers on garnet thin films. Room temperature water is used to pre-treat a pristine garnet film to generate a uniform H-LLZO layer on its surface. The thin film is then acid-etched to form a uniform porous layer on the garnet thin film surface, with a porous layer thickness in a range of 2 μm to 30 μm, or 2 μm to 20 μm (e.g., 2 μm to 5 μm), or 2 μm to 15 μm, or 2 μm to 10 μm, or 2 μm to 5 μm, or any sub-range or value lying therein. Pore size of the porous layer may be in a range of 0.1 μm to 10 μm, or 0.1 μm to 5 μm (e.g., 1 μm to 5 μm), or 5 μm to 10 μm, or 1 μm to 5 μm, or 0.1 μm to 2 μm, or any sub-range or value lying therein.

Water soaking may be conducted at a temperature in a range of 0° C. to 50° C. (e.g., room temperature), or 0° C. to 40° C., or 0° C. to 30° C., or 0° C. to 25° C., or 0° C. to 20° C., or 0° C. to 10° C., or 10° C. to 30° C., or 15° C. to 25° C., or 25° C. to 50° C., or any sub-range or value lying therein, for a time in a range of 0.5 min to 60 min, or 1 min to 45 min (e.g., 5 min to 30 min), or 0.5 min to 30 min, or 30 min to 60 min, or 5 min to 20 min, or 15 min to 45 min, or any sub-range or value lying therein.

Acid treatment may be conducted with HCl (hydrochloric acid), $HNO_3$ (nitric acid), $HC_2H_3O_2$ (acetic acid), $H_2SO_4$ (sulfuric acid), $H_3C_6H_5O_7$ (citric acid), $H_2CO_3$ (carbonic acid), $H_3PO_4$ (phosphoric acid), HF (hydrofluoric acid), $H_2C_2O_4$ (oxalic acid), $H_3BO_3$ (boric acid), or combinations thereof, at concentrations in a range of 0.01M to 5M, or 0.1M to 5M, or 1M to 5M (e.g., 0.5M to 2M), or 2.5M to 5M, or 0.01M to 2M, 0.5M to 2.5M, or 1M to 3M, or 3M to 5M, or any sub-range or value lying therein, for a time in a range of 0.5 min to 60 min, or 1 min to 45 min (e.g., 5 min to 30 min), or 0.5 min to 30 min, or 30 min to 60 min, or 5 min to 20 min, or 15 min to 45 min, or any sub-range or value lying therein, at a temperature in a range of 15° C. to 25° C. (e.g., room temperature).

Example 1

Fabrication of Sintered Garnet Membrane

Garnet powder is made by solid state reaction of mixed precursor powders $Li_2CO_3$, $La_2O_3$, $ZrO_2$ and $Ta_2O_5$, and like components. The powders are thoroughly dry mixed with, for example, turbulent mixing for 30 to 60 min with $ZrO_2$ media, and wet mixed, for example, in a liquid carrier such as isopropanol (IPA) or de-ionized water. The starting components are first combined using a vibratory mixer for 1 to 2 hrs until the mixed components de-agglomerate. The batch was then ball milled for about 1 to 2 hrs for further mixing. To avoid significant interaction between the liquid carrier and precursor components, a preferred total mixing time was, for example, less than 6 hrs. Then, the resulting slurry was dried at 100° C. for 1 to 2 days. The dried powder was then ready for calcination.

The calcination temperature depends on the composition. Low temperature compositions can be dried at, for example, 1000° C. to 1100° C., whereas high temperature compositions can be up to 1200° C. In examples, the powder is double calcined, first at 950° C. for 5 hrs and second at 1200° C. for 5 hrs to form a garnet structure having a cubic lithium garnet phase larger than 90%.

After calcination, the powder was milled by either dry ball or dry jet milled. Ball milling was a very fast and low cost milling process. After ball milling, the powder usually has a bi-modal distribution, such as 0.5-0.8 μm and 6-8 μm, with no agglomerates. Jet milling is a high energy process, and a very fine powder can be achieved by colliding particles or using an impact liner surface (such as $ZrO_2$, alumina, tungsten, etc.). Lithium garnet calls for a $ZrO_2$ liner. After jet milling, the powder usually has a mono-modal distribution with a D50 around 0.5-0.8 μm. In examples, the obtained calcined powder is jet milled to a particle size D50 of 0.6 μm.

Thin films of garnet (as defined above) were tape cast, and then the green tape is fired in an inert atmosphere (e.g., Ar, $N_2$, or combinations thereof) sandwiched between graphite sheets to a temperature of 1100° C. to 1300° C. (e.g., 1190° C.). A bottom graphite sheet functions as a setter (i.e., where the green tape sits) and the top graphite functions to prevent tape warping. In examples, the top graphite sheet is optional. The firing temperature is selected to achieve a dense garnet thin film, and may be optimized based on green tape composition, desired density, furnace conditions (e.g., temperature ramp speed).

Garnet compositions formed from the fabricated garnet membrane include stoichiometric 0.5Ta:LLZO ($Li_{6.5}La_3Zr_{1.5}Ta_{0.5}O_{12}$; Composition 1). Composition 1 was used in water pre-treatment (Example 2) and acid treatment (Example 3) studies below.

Example 2

Pre-Acid Treatment Processes

Garnet thin films formed from Example 1 may undergo various pre-acid treatment processes. In a modified acid treatment method, annealing and water soaking is conducted, either in combination with each other or alone as a standalone treatment, before acid treatment. With this method, a uniform porous layer on garnet may be demonstrated.

Pre-acid treatment 1: after firing (see Example 1), the garnet thin film is heated in an $Ar/O_2$ gas (3:1 ratio) environment at 900° C. for 1 hour ("as-made"). This pre-treatment recovers the garnet surface to pristine garnet.

Pre-acid treatment 2: the as-made sample (e.g., from pre-acid treatment 1) is heated in ambient air at 800° C. for 1 hour. This treatment generates a carbonated garnet surface by allowing garnet to react with air.

Pre-acid treatment 3: the as-made sample is soaked in room temperature water for 10 min.

Pre-acid treatment 4: the as-made sample is soaked in 50° C. water for 10 min.

Example 3

Acid Treatment Processes

Extended acid treatment can result in substantial $H^+/Li^+$ exchange. The garnet surface, bulk, or both, can be "titrated" with a suitable acid to achieve a super-protonated surface or bulk composition. If the extent of exchange is sufficient, the garnet no longer behaves as a base, i.e., the aqueous pH no longer shifts to substantially basic when the protonated material is immersed in neutral water. If the garnet is sufficiently neutralized by acid, LiOH is not formed under ambient atmospheric exposure. Accordingly, the garnet no longer forms a lithium carbonate surface layer and can be freely handled in ambient conditions.

Acid treatment process 1: Samples from pre-acid treatment 1 were exposed to two concentrations of HCl solutions (1M and 1.5M) for 20 min. The amount of acid used in acid treatment process 1 was 2 $g/cm^2$ garnet area (one side surface).

Figure 2A:
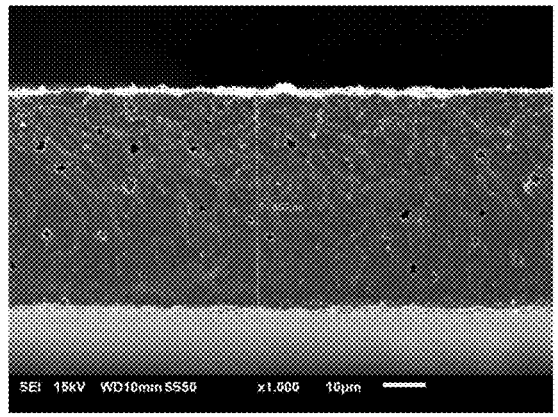
FIGS. 2A, 2D, and 2G illustrate cross-sectional and surface scanning electron microscopy (SEM) images of a stoichiometric $Li_{6.5}La_3Zr_{1.5}Ta_{0.5}O_{12}$ (Ta-LLZO) garnet thin film after post heat treatment in $Ar/O_2$ at 900° C. for 1 hr ("as-made"), according to embodiments.
Figure 2B:
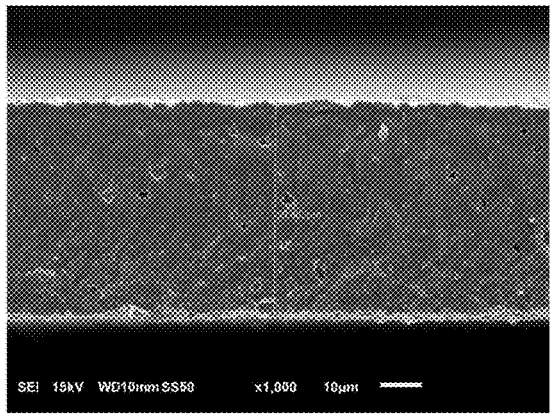
FIGS. 2B, 2E, 2H, and 2I illustrate cross-sectional and surface SEM images of the as-made sample after a 20 min treatment with 1M HCl solution, according to embodiments.
Figure 2C:
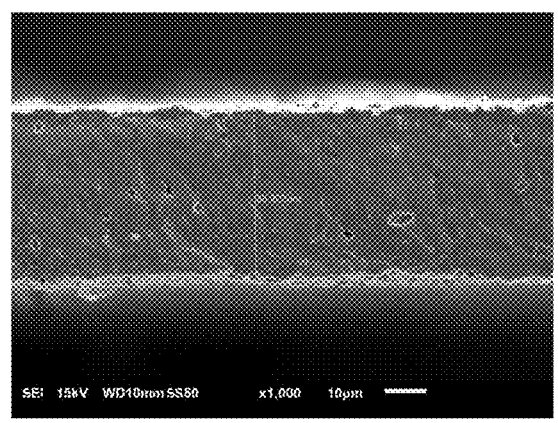
FIGS. 2C, 2F, and 2J illustrate cross-sectional and surface SEM images of the as-made sample after a 20 min treatment with 1.5M HCl solution, according to embodiments.
Figure 2D:
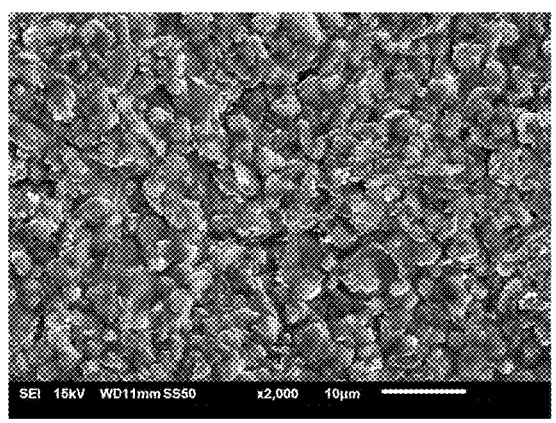
Figure 2E:
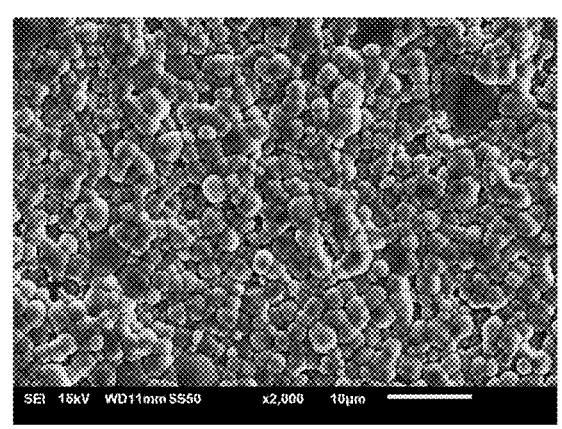
Figure 2F:
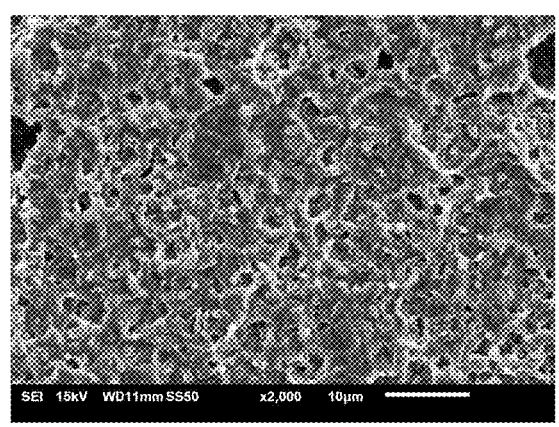
Figure 2G:
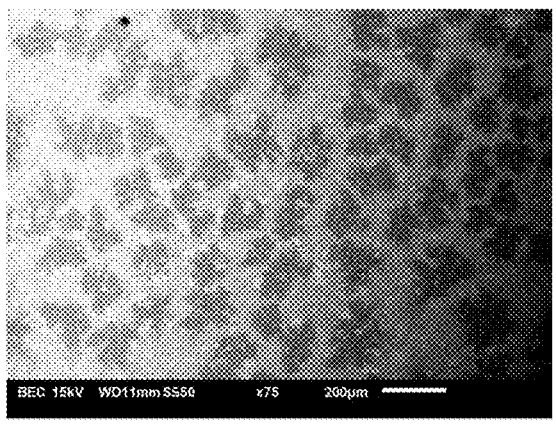
Figure 2H:
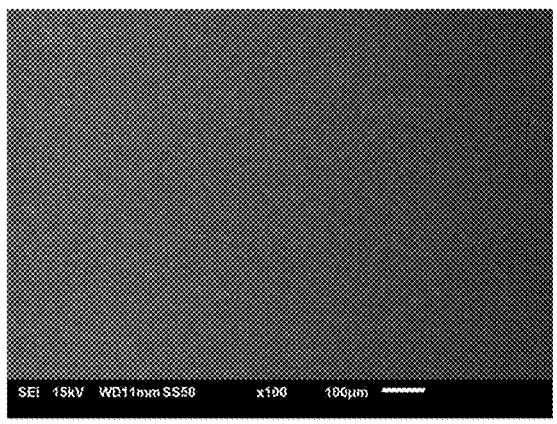
Figure 2I:
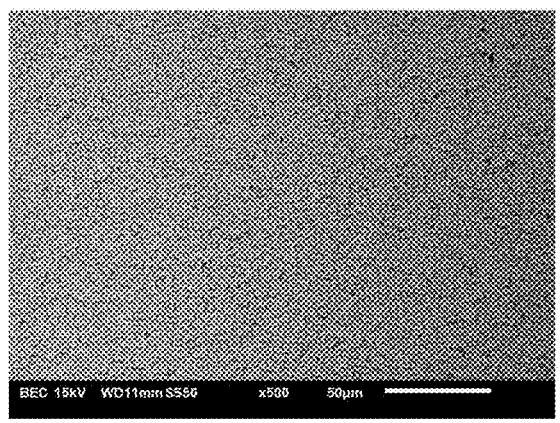

FIGS. 2A, 2D, and 2G illustrate cross-sectional and surface scanning electron microscopy (SEM) images of a stoichiometric $Li_{6.5}La_3Zr_{1.4}Ta_{0.5}O_{12}$ (Ta-LLZO) garnet thin film after post heat treatment in $Ar/O_2$ at 900° C. for 1 hr ("as-made"). This treatment removes all surface $Li_2CO_3$/LiOH and generates a fresh garnet (i.e., Ta-LLZO) surface. In other words, the garnet surface is not protonated garnet (H-LLZO). This composition is reactive to $H_2O$ and $CO_2$ in air and $Li_2CO_3$/LiOH can quickly re form on the surface. FIG. 2G, a back-scattered SEM image of a larger area, shows some black and white features on the surface; these are from garnet-air reactions which form $Li_2CO_3$/LiOH (black features) and dusts (white features). FIG. 2D is a close-up of the black color feature and shows irregular shape or rough surface grains of the $Li_2CO_3$. In FIGS. 2A, 2D, and 2G, samples were handled in air.

FIGS. 2B, 2E, 2H, and 2I illustrate cross-sectional and surface SEM images of the as-made sample after a 20 min treatment with 1M HCl solution. From large scale to zoomed-in images, the garnet surface is clean and smooth throughout. The back scattered image of FIG. 2I appears in uniform color, indicating uniform chemical composition. $Li_2CO_3$ has been removed from the surface, leaving smooth surfaces of the garnet grains. The acid treatment was conducted in ambient air, and the treated sample has been exposed to air for about 20 min. $Li_2CO_3$ is no longer generated on the surface indicating that the acid treated surface (H-LLZO in composition) is inert to air. After 1M HCl treatment, no significant sample thickness change is observed.

Generally, Ta-LLZO exposed to acid treatment may undergo the following reaction to form H-LLZO:

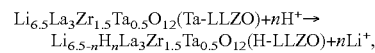

$Li_{6.5}La_3Zr_{1.5}Ta_{0.5}O_{12}(\text{Ta-LLZO})+nH^+ \rightarrow Li_{6.5-n}H_nLa_3Zr_{1.5}Ta_{0.5}O_{12}(\text{H-LLZO})+nLi^+,$ where n=1-3.

Figure 2J:
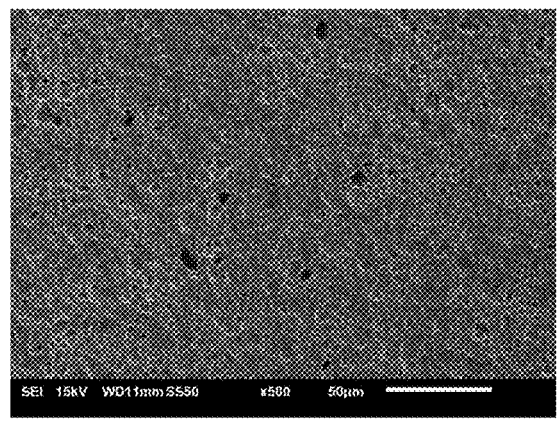

FIGS. 2C, 2F, and 2J illustrate cross-sectional and surface SEM images of the as-made sample after a 20 min treatment with 1.5M HCl solution. FIG. 2J shows a rough surface formed with scattered large or small pores of different depths. This sample's thickness is significantly reduced (51.3 μm originally, 39.8 μm after etching; FIG. 2C). As is the case for the 1M HCl solution treatment, the acid-treated surface has a H-LLZO surface. Garnet may decompose in strong acid, with the decomposed portion being removed from the surface and leaving behind H-LLZO.

Acid treatment process 2: Samples from pre-acid treatment 2 were exposed to two concentrations of HCl solutions (1M and 1.5M) for 20 min. The amount of acid used in acid treatment process 2 was 2 $g/cm^2$ garnet area (one side surface).

Figure 3A:
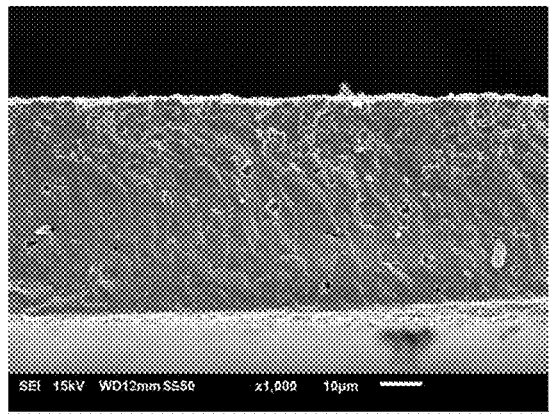
FIGS. 3A and 3D illustrate cross-sectional and surface SEM images of a stoichiometric $Li_{6.5}La_3Zr_{1.5}Ta_{0.5}O_{12}$ (Ta-LLZO) garnet thin film ("as-made") after post heat treatment in air at 800° C. for 1 hr, according to embodiments.
Figure 3B:
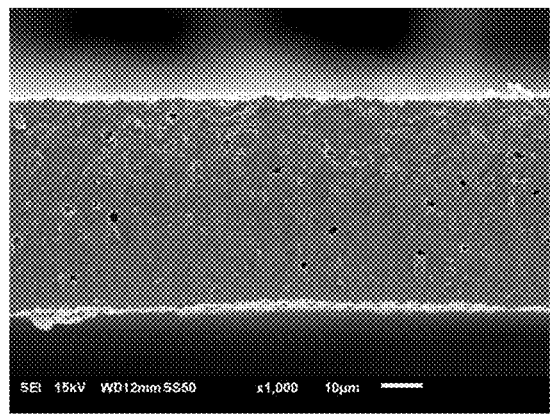
FIGS. 3B and 3E illustrate cross-sectional and surface SEM images of the post heat-treated sample after a 20 min treatment with 1M HCl solution, according to embodiments.
Figure 3C:
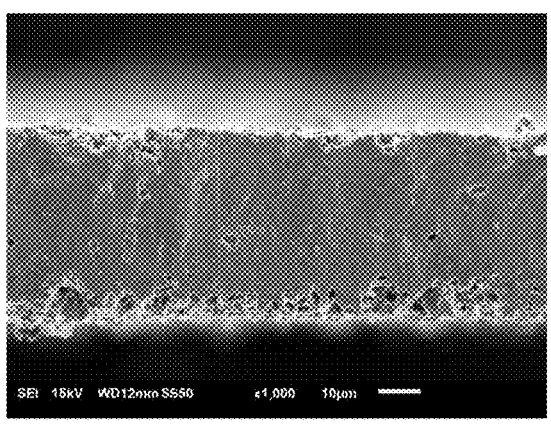
FIGS. 3C, 3F, and 3G illustrate cross-sectional and surface SEM images of the post heat-treated sample after a 20 min treatment with 1.5M HCl solution, according to embodiments.
Figure 3D:
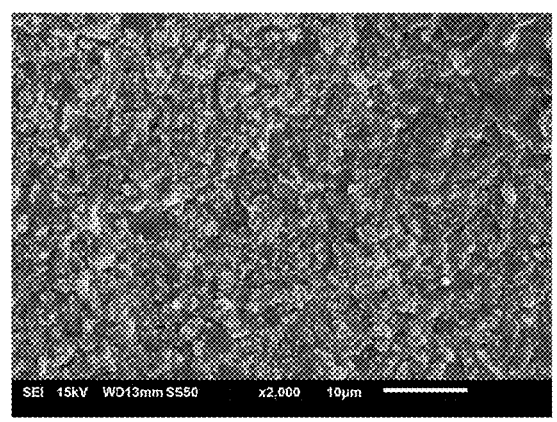

FIGS. 3A and 3D illustrate cross-sectional and surface SEM images of a stoichiometric $Li_{6.5}La_3Zr_{1.5}Ta_{0.5}O_{12}$ (Ta-LLZO) garnet thin film ("as-made") after post heat treatment in air at 800° C. for 1 hr. The surface is fully covered by thick irregularly-shaped $Li_2CO_3$ grains, indicating that the surface was heavily carbonated by reaction with air at elevated temperature. The formation of $Li_2CO_3$ on garnet was accompanied with a formation of H-LLZO on the garnet surface.

Figure 3E:
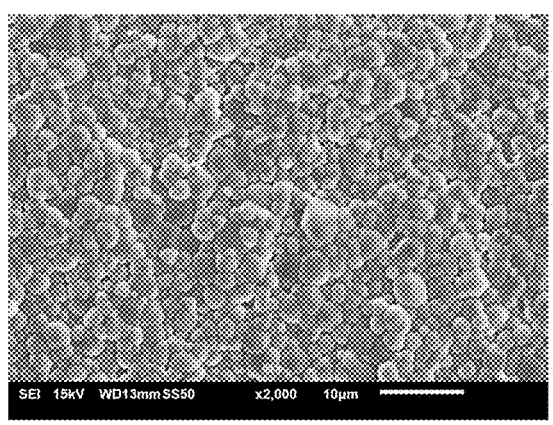

FIGS. 3B and 3E illustrate cross-sectional and surface SEM images of the post heat-treated sample after a 20 min treatment with 1M HCl solution. Again, after this treatment, the surface became smooth and $Li_2CO_3$ free, similar to what is seen in the 20 min treatment with 1M HCl solution from acid treatment process 1 above. Thickness of the surface decreased from 50.4 μm to 48.8 μm.

Figure 3F:
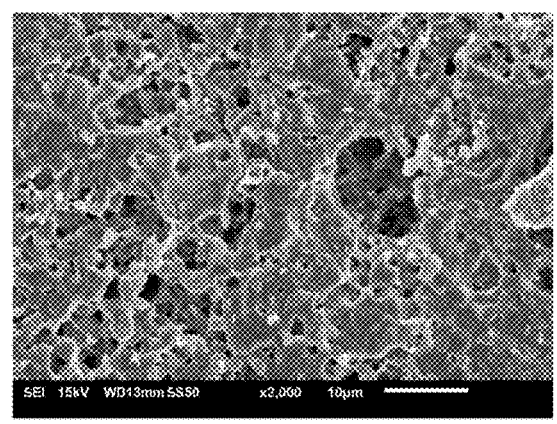
Figure 3G:
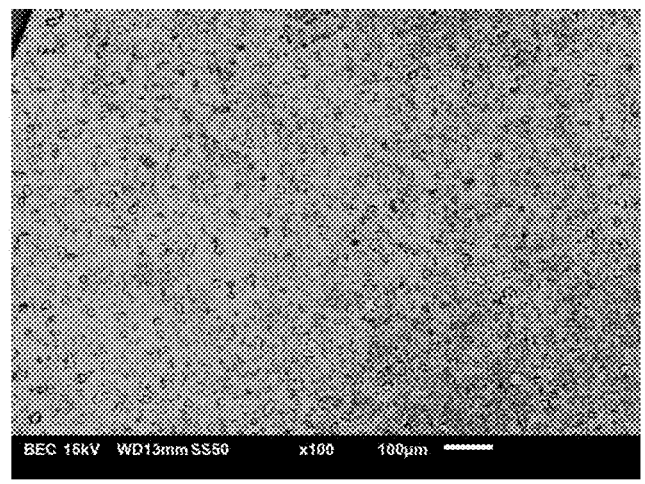

FIGS. 3C, 3F, and 3G illustrate cross-sectional and surface SEM images of the post heat-treated sample after a 20 min treatment with 1.5M HCl solution. The surface is a thick porous layer which is not uniform across the whole sample's surface. FIG. 3G shows a larger area of the sample surface, displaying patches of highly porous regions and relatively smooth regions. Though the total thickness of the samples decreased to 44.7 µm, this is still thicker than the as-made sample after the 20 min treatment with 1.5M HCl solution (FIG. 2C, 39.8 µm). This implies that the formed surface H-LLZO layer by the 800° C.-1 hr treatment in ambient air may be more durable to acid etching. The non-uniform porous structure may be an indication of non-uniform H-LLZO across the surface by reaction with air.

Acid treatment process 3: Samples from pre-acid treatments 3 and 4 were exposed to two concentrations of HCl solutions (1M and 1.5M) for 20 min. In other words, a water pre-treatment was applied to the garnet thin film samples before acid treatment with 1M or 1.5M HCl for 20 min. Two water pre-treatment conditions were compared, one with room temperature water and one with 50° C. water. The amount of acid used in acid treatment processes 3 and 4 was 2 g/cm$^2$ garnet area (one side surface).

After water pre-treatment, the garnet thin film forms a layer of H-LLZO. Higher water treatment temperature results in a thicker layer of H-LLZO due to higher proton mobility at higher temperatures.

Figure 4A:
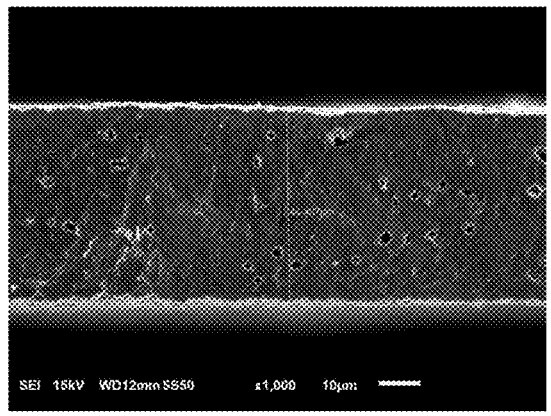
FIGS. 4A and 4B illustrate cross-sectional and surface SEM images of a stoichiometric $Li_{6.5}La_3Zr_{1.5}Ta_{0.5}O_{12}$ (Ta-LLZO) garnet thin film after post heat treatment in $Ar/O_2$ at 900° C. for 1 hr ("as-made"), and then soaked in room temperature (RT) deionized (DI) water for 10 min, according to embodiments.
Figure 4B:
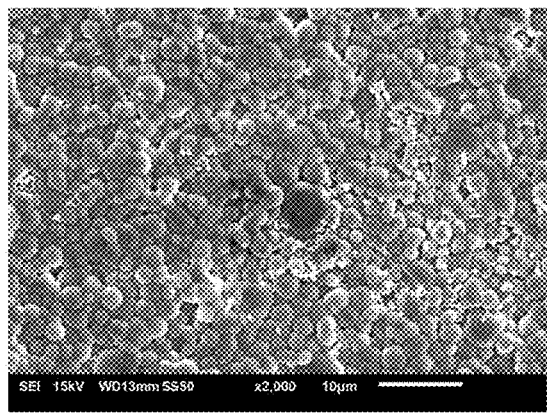
Figure 4C:
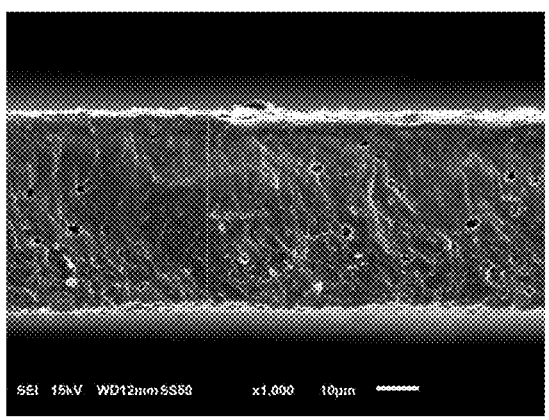
FIGS. 4C and 4D illustrate cross-sectional and surface SEM images of the as-made sample soaked in RT DI water for 10 min (as in FIGS. 4A and 4B), and then exposed to a 20 min treatment with 1M HCl solution, according to embodiments.
Figure 4D:
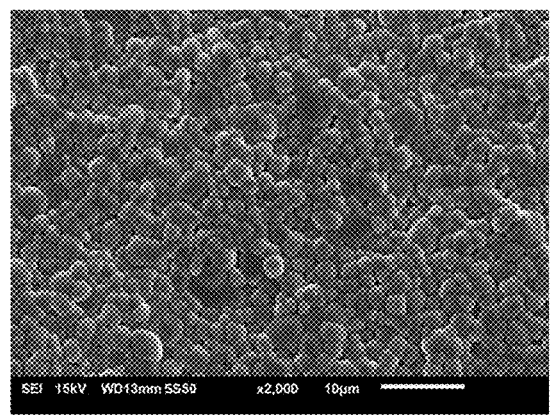
Figure 4E:
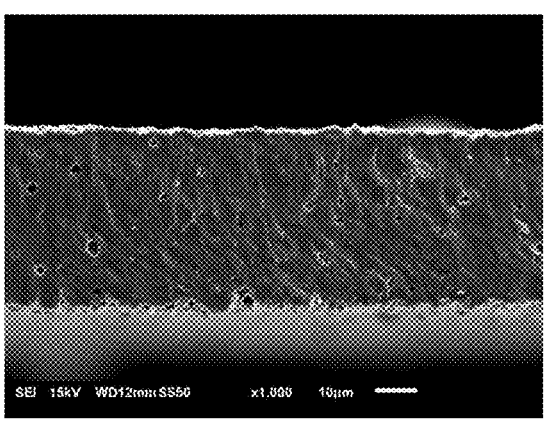
FIGS. 4E and 4F illustrate cross-sectional and surface SEM images of the as-made sample soaked in RT DI water for 10 min (as in FIGS. 4A and 4B), and then exposed to a 20 min treatment with 1.5M HCl solution, according to embodiments.
Figure 4F:
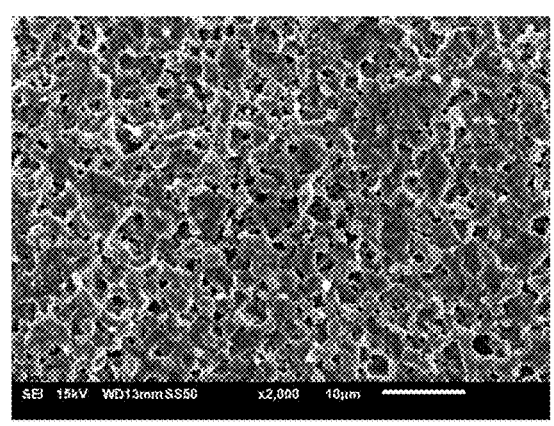

FIGS. 4A and 4B illustrate cross-sectional and surface SEM images of a stoichiometric $Li_{6.5}La_3Zr_{1.4}Ta_{0.5}O_{12}$ (Ta-LLZO) garnet thin film after post heat treatment in $Ar/O_2$ at 900° C. for 1 hr ("as-made"), and then soaked in room temperature (RT) deionized (DI) water for 10 min. The $Ar/O_2$ gas mixture prevents garnet contact moisture and $N_2$. FIGS. 4C and 4D illustrate cross-sectional and surface SEM images of the as-made sample soaked in RT DI water for 10 min (as in FIGS. 4A and 4B), and then exposed to a 20 min treatment with 1M HCl solution. FIGS. 4E and 4F illustrate cross-sectional and surface SEM images of the as-made sample soaked in RT DI water for 10 min (as in FIGS. 4A and 4B), and then exposed to a 20 min treatment with 1.5M HCl solution.

Same as the 900° C. $Ar/O_2$ and 800° C. air-treated garnet, the RT water soaked samples after a 1M HCl treatment (FIG. 4D) has a smooth and clean surface. Differently, after a RT water soak and then a 1.5M HCl treatment, a uniform porous garnet surface is created (see FIG. 4F, comparing to FIGS. 2F and 3F, both of which show a non-uniform porous garnet surface). Uniform porous garnet surfaces may be ascribed to more uniform H-LLZO layers formed during water treatment, as compared to non-water treated or significant air carbonated surfaces. The thickness reduction by acid etch for the water treated garnet is lower than the other pre-treated garnet. After 1.5M HCl etching, the water-treated, as-made, and 800° C. air heated garnet films have thickness reductions of 6.0%, 22.4%, and 11.3%, respectively. This trend supports the conclusion that H-LLZO surface is more difficult to etch than straight LLZO surfaces.

Figure 5A:
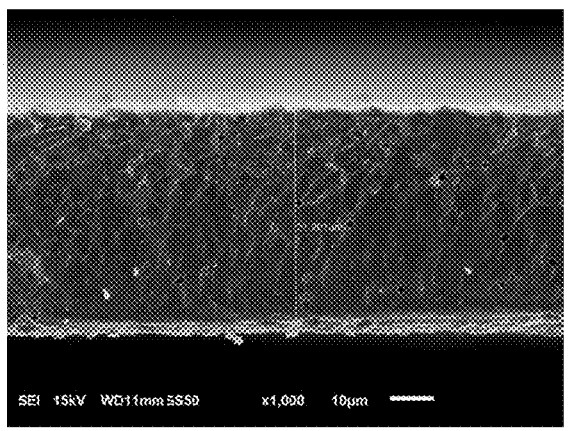
FIG. 5A illustrates cross-sectional and surface SEM images of a stoichiometric $Li_{6.5}La_3Zr_{1.5}Ta_{0.5}O_{12}$ (Ta-LLZO) garnet thin film after post heat treatment in $Ar/O_2$ at 900° C. for 1 hr ("as-made"), according to embodiments.
Figure 5B:
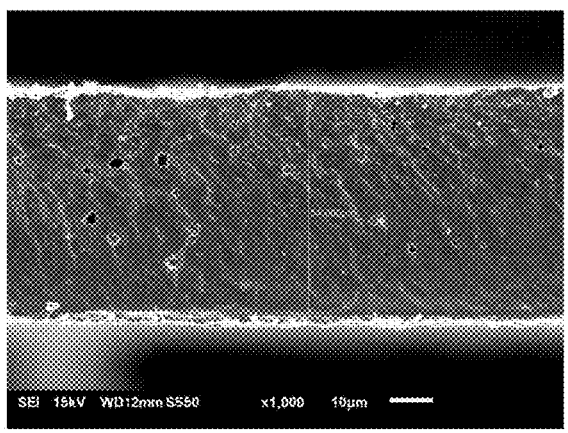
FIGS. 5B and 5C illustrate cross-sectional and surface SEM images of the as-made sample soaked in 50° C. DI water for 10 min, and then exposed to a 20 min treatment with 1.5M HCl solution, according to embodiments.
Figure 5C:
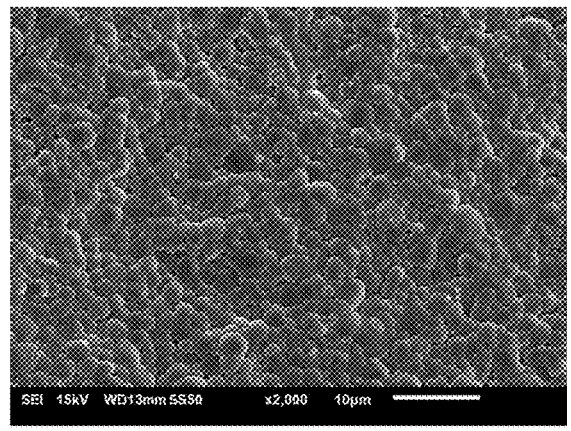

After higher temperature water treatments (50° C.), a thicker H-LLZO surface layer was formed on garnet thin film or, or a surface layer is formed having higher Li—H exchange rates (n is larger in $Li_{6.5-n}H_nLa_3Zr_{1.5}Ta_{0.5}O_{12}$), making it more resistant to acid etch. FIG. 5A illustrates cross-sectional and surface SEM images of a stoichiometric $Li_{6.5}La_3Zr_{1.4}Ta_{0.5}O_{12}$ (Ta-LLZO) garnet thin film after post heat treatment in $Ar/O_2$ at 900° C. for 1 hr ("as-made"). The garnet thin film showed a thickness of 51.2 µm. FIGS. 5B and 5C illustrate cross-sectional and surface SEM images of the as-made sample soaked in 50° C. DI water for 10 min, and then exposed to a 20 min treatment with 1.5M HCl solution. After the 1.5M HCl treatment, the surface is still smooth, with the thickness of the samples not being reduced. This experiment indicates that thicker or higher Li—H exchange rate surfaces are more difficult to etch. Higher acid concentrations are needed to generate porous structure layers. This experiment also provides a method for securely making smooth garnet surfaces if any cell assembly is needed.

Morphology and Phase Analysis. SEM images were obtained by scanning electron microscope (SEM, Joel, JSM-6010plus LA).

Thus, as presented herein, this disclosure relates to improved acid treatment methods to form uniform porous layers on garnet and a porous compositions thereof.

Specifically, this application discloses a water soaking pretreatment, followed by a soak in acid. These treatments generate a uniform porous structure layer. Direct acid treatments lead to non-uniform porous structures in terms of porous layer depth, pore size, and porous structure distribution, meaning that these properties vary over the garnet surface from location-to-location. Porous structures made by the disclosed method is stable with ambient air because it contains an air stable H-LLZO protection layer on the porous surface, thereby making the films stable in air. Current technologies describe methods using green tape lamination to form a porous layer on garnet. In those methods, the pore surfaces of the as-sintered garnet film are pristine garnet, which react with water and $CO_2$ in air and form non-$Li^+$ conductive $Li_2CO_3$ on the pore surfaces.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed:

1. A method of making a solid garnet membrane, comprising:
   pre-treating a solid garnet membrane comprising an air sensitive lithium-containing garnet with water by soaking the air sensitive lithium-containing garnet in water at a temperature in a range of 0° C. to 50° C. for a time in a range of 0.5 minutes to 60 minutes to form a uniform protonated garnet surface composition; and
   contacting the uniform protonated garnet surface composition of the solid garnet membrane with an acid to form a porous uniform protonated garnet surface composition, wherein the acid is at a concentration in a range of 1M to 5M.

2. The method of claim 1, wherein the temperature is in a range of room temperature to 50° C. and the time is in a range of 0.5 minutes to 10 minutes.

3. The method of claim 1, wherein the acid is selected from at least one of: a mineral acid, an organic acid, or a combination thereof.

4. The method of claim 1, wherein the acid comprises hydrochloric acid, nitric acid, acetic acid, sulfuric acid, citric acid, carbonic acid, phosphoric acid, hydrofluoric acid, oxalic acid, boric acid, or combinations thereof.

5. The method of claim 1, wherein the concentration is in a range of 1M to 2M.

6. The method of claim 1, wherein the concentration is in a range of 1M to 3M.

7. The method of claim 1, wherein the contacting is conducted at a temperature in a range of 15° C. to 25° C. for a time in a range of 0.5 minutes to 60 minutes.

8. The method of claim 7, wherein the time is in a range of 10 minutes to 30 minutes.

9. The method of claim 1, wherein the porous uniform protonated garnet surface composition has a thickness in a range of 2 μm to 30 μm.

10. The method of claim 9, wherein the thickness is in a range of 2 μm to 10 μm.

11. The method of claim 1, wherein the porous uniform protonated garnet surface composition has a pore size in a range of 0.1 μm to 10 μm.

12. The method of claim 11, wherein the pore size is in a range of 1 μm to 5 μm.

13. The method of claim 1, wherein prior to the pre-treating:
heat treating the air sensitive lithium-containing garnet in a water free and $CO_2$ free environment.

14. The method of claim 1, wherein:
the air sensitive lithium-containing garnet is $Li_7La_3Zr_2O_{12}$ and the porous uniform protonated garnet surface composition is $Li_{(7-x)}H_xLa_3Zr_2O_{12}$, where x is from 0.1 to 7.

15. The method of claim 1, wherein:
the air sensitive lithium-containing is $Li_{6.5}La_3Zr_{1.5}Ta_{0.5}O_{12}$ and
the porous uniform protonated garnet surface composition is $Li_{6.5-n}H_nLa_3Zr_{1.5}Ta_{0.5}O_{12}$, where x is from 0.1 to 6.5.

16. The method of claim 1, wherein the porous uniform protonated garnet surface composition is compositionally stable in air and insensitive to water and carbon dioxide.

17. The method of claim 1, wherein the porous uniform protonated garnet surface composition on an exterior surface of the solid garnet-membrane comprises an entire exterior surface of the solid garnet membrane.

18. The method of claim 1, wherein the porous uniform protonated garnet surface composition is uniformly disposed over an entirety of an exterior surface of the solid garnet membrane.

19. The method of claim 1, wherein the porous uniform protonated garnet surface composition comprises a surface free of one or more of $LiOH$, $Li_2CO_3$, or a combination thereof.

20. A method of making a solid garnet membrane, consisting of:
pre-treating a solid garnet membrane of an air sensitive lithium-containing garnet with water by soaking the air sensitive lithium-containing garnet in water at a temperature in a range of 0° C. to 50° C. for a time in a range of 0.5 minutes to 60 minutes to form a uniform protonated garnet surface composition; and
contacting the uniform protonated garnet surface composition of the solid garnet membrane with an acid to form a porous uniform protonated garnet surface composition, wherein the acid is at a concentration in a range of 1M to 5M.

* * * * *